United States Patent
Matsunuma et al.

[11] Patent Number: 6,013,118
[45] Date of Patent: Jan. 11, 2000

[54] PARTICULATE TRAP FOR A DIESEL ENGINE

[75] Inventors: Kenji Matsunuma; Naruhito Nakajima, both of Itami, Japan

[73] Assignee: Sumitomo Electric Industries, Ltd., Osaka, Japan

[21] Appl. No.: 08/952,471

[22] PCT Filed: Aug. 27, 1996

[86] PCT No.: PCT/JP96/02405

§ 371 Date: Nov. 17, 1997

§ 102(e) Date: Nov. 17, 1997

[87] PCT Pub. No.: WO98/09059

PCT Pub. Date: Mar. 5, 1998

[51] Int. Cl.[7] .......................... B01D 29/54; B01D 29/62; B01D 35/18

[52] U.S. Cl. ................ 55/282.3; 55/482; 55/DIG. 10; 55/DIG. 30; 60/303; 60/311

[58] Field of Search .................. 55/282.2, 282.3, 55/482, 483, DIG. 10, DIG. 30, 282.1; 60/303, 311

[56] References Cited

U.S. PATENT DOCUMENTS 5,709,722  1/1998  Nagai et al. ..................... 55/DIG. 30

FOREIGN PATENT DOCUMENTS

| | | |
|---|---|---|
| 5-222920 | 8/1993 | Japan . |
| 6-101449 | 4/1994 | Japan . |
| 6-146856 | 5/1994 | Japan . |
| 6-257422 | 9/1994 | Japan . |
| 6-264715 | 9/1994 | Japan . |
| 6-264722 | 9/1994 | Japan . |
| 7-505693 | 6/1995 | Japan . |
| 8-93450 | 4/1996 | Japan . |
| 8-232642 | 9/1996 | Japan . |
| 2163969 | 3/1986 | United Kingdom ............... 60/311 |

*Primary Examiner*—David A. Simmons
*Assistant Examiner*—Robert A. Hopkins
*Attorney, Agent, or Firm*—McDermott, Will & Emery

[57] ABSTRACT

An object is to provide a particulate trap for a diesel engine which can efficiently burn particulates trapped by a filter while supplying oxygen by natural convection so that the filter can be regenerated in a short time while minimizing the power consumed by the heater. To accomplish this purpose, end plates 6, 7 and brackets 9 may be welded to compressed portions 4a, 5a of an inner cylinder 4 and an outer cylinder 5; heater-supporting ceramic insulators are mounted, spaced from each other, on a heater 14; and/or an ambient air introducing passage 36 is provided to extend from outside the case into a multiple-cylinder filter provided in the case.

7 Claims, 14 Drawing Sheets

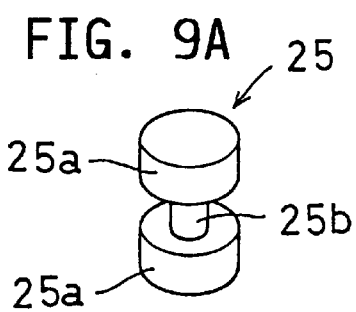
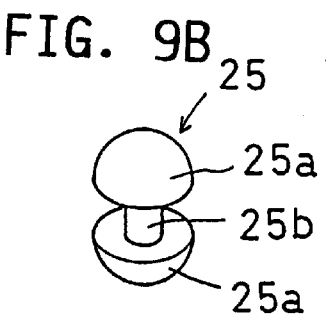
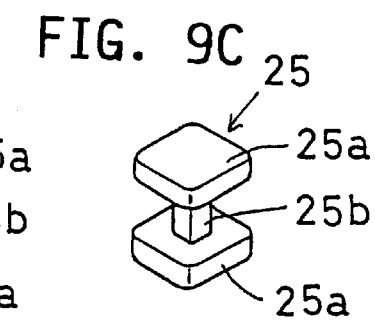
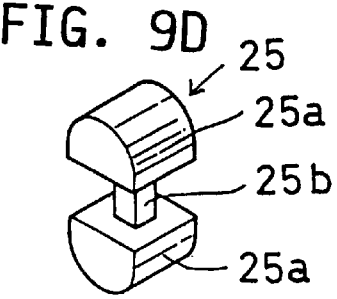
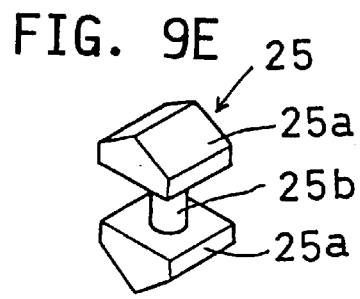
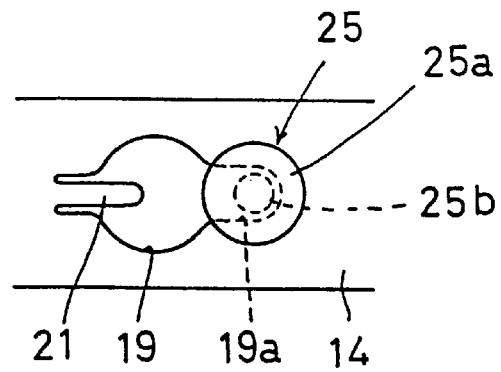
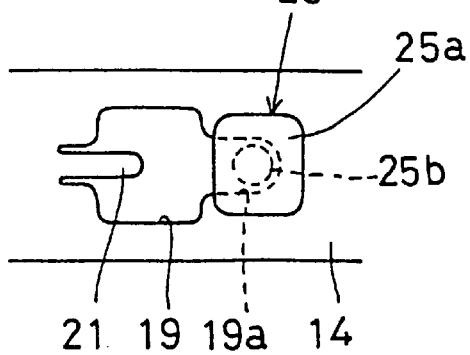
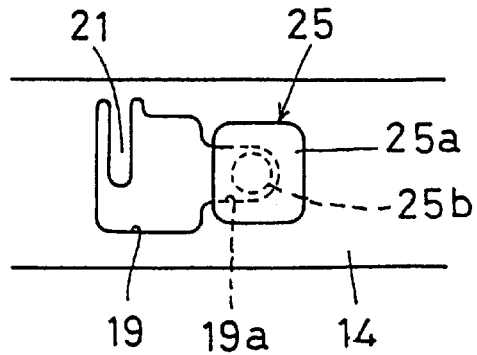

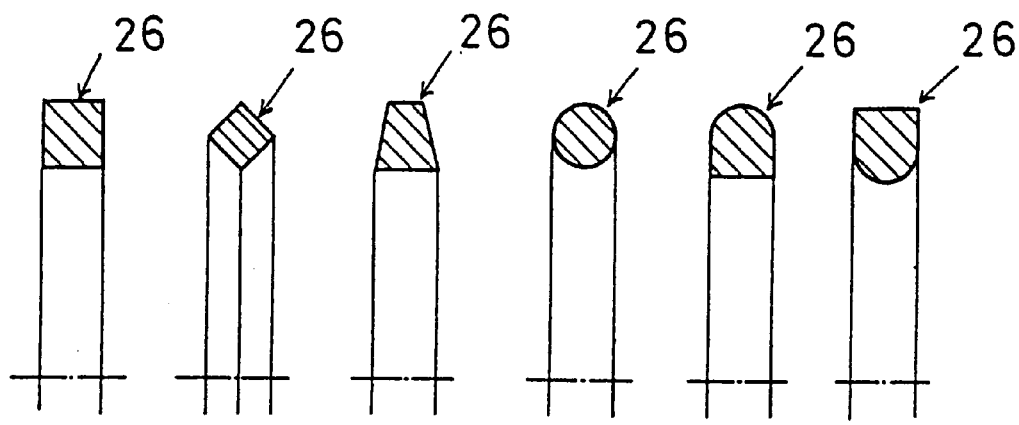

PARTICULATE TRAP FOR A DIESEL ENGINE

TECHNICAL FIELD

The present invention relates to a particulate trap for trapping and removing particulates such as carbon contained in diesel engine exhaust gas.

BACKGROUND ART

Emissions from automobiles are a major cause of air pollution. It is therefore of extreme importance to develop a technique for removing noxious components in automobile emissions.

It is particularly important and urgently required to develop a technique for removing particulates contained in diesel engine emissions, which are mainly NOx and carbon.

To remove such noxious components in exhaust gas, it has been proposed to provide a particulate trap in an exhaust gas line to trap and remove any noxious components. Other conventional exhaust gas purifying means include various improvements in the engine itself such as exhaust gas recirculation (EGR) systems and improved fuel injection systems. But none of them are decisive solutions.

As of today, it is considered more promising to treat exhaust gas with a trap. Rigorous efforts are now being made to improve such traps.

A particulate trap comprises a case mounted in an exhaust gas line, and a filter element housed in the case. Exposed to high-temperature exhaust gas, the filter element has to be highly heat-resistant. Also, in order to efficiently trap particulates, the filter element should have as large a trapping area as possible. It is also necessary to prevent leakage of exhaust gas through its mounting portion.

Moreover, the filter element has to be vibration-resistant enough not to be damaged or broken due to vehicle vibration, simple in structure so as to be manufactured at low cost. It is also required that the energy cost for regeneration of the filter element, i.e. for burning particulates trapped be as low as possible.

In order to meet all these requirements, various factors have to be taken into consideration, including the material and shape of the filter element, end sealing structure, and the structure for securing the filter element to the case.

Such particulate traps are disclosed e.g. in unexamined Japanese patent publications 6-146856, 6-264715, 5-222920, and 6-257422.

Particulates trapped have to be periodically removed for regeneration of the filter. Unexamined Japanese patent publications 5-22290, 6-146856, 6-264722 propose to burn particulates with an electric heater. These traps have a plurality of filters arranged in parallel. Some of these traps (such as one disclosed in unexamined Japanese patent publication 6-101449) have an exhaust gas purifier for regenerating the filter by burning while the engine is running without extremely reducing the heat efficiency of the heater (by controlling the flow rate of exhaust gas by means of valves) and while supplying enough oxygen for complete combustion of soot (particulates).

But in the case of a trap of the type that controls the amount of emissions, a delicate touch is required for such control. Also, a device for controlling the amount of emissions has to be resistant to heat from exhaust gas. Naturally, the entire trap tends to be complicated in structure and costly.

There is also known a relatively simple exhaust gas purifier of a type in which particulates are burned for regeneration of the filter while the engine is at a stop. Some of the devices of this type resort to an external air source or an electric fan for supplying oxygen necessary to burn particulates trapped during the regeneration step. More recent devices have a filter case having a shape that makes it possible to supply oxygen by natural convection, thereby eliminating the need for an external or auxiliary device for supplying oxygen.

Any of the particulate traps disclosed in the above-listed publications uses cylindrical filters. The trap disclosed in the publication 6-146856 has insulating members provided at either end of the cylindrical filters with one of the insulators sandwiched between the cylindrical filters and the case and the other pressed against the filter end by a screw-tightened presser to fix the filters and seal the filter ends. In this arrangement, the insulators tend to be damaged by heat of exhaust gas and vehicle vibration. Also, gap may be formed between sealing surfaces due to differences in thermal expansion between the filter and the case. It is thus difficult to completely prevent the leakage of exhaust gas.

The trap disclosed in the publication 6-264715 has cylindrical filters having one end thereof closed by fitting a protrusion of a support plate provided in the case, and the other end fixed to the case by a bracket. In this arrangement, due to difference in thermal expansion between the filter and the support plate, gap may be formed in the closed portion through which exhaust gas can leak. Such a gap permits displacement of the filters. The support portions of the filters are thus likely to be damaged by vibration.

The trap disclosed in the publication 5-222920 has a cylindrical filter having a closed bottom and thus is free of problem of reduced sealing at one end of the filter. But such metal filters are difficult to mass-produce and thus costly.

The trap proposed by the applicant of this invention in the publication 6-257422 has a filter element comprising at least two cylindrical filters having different diameters from each other and concentrically fitted together. This trap has a large particulate trapping area. Particulates trapped can be efficiently burned with a heater provided between the two cylindrical filters. Exhaust gas incoming and outgoing spaces are formed by alternately closing the openings at either end with end plates. Such a filter element can be manufactured easily, though it is equivalent in function to an integrally formed cylindrical filter having a closed bottom.

One problem with this trap is that it is difficult to fix e.g. the end plates in position. Brazing and welding are possible ways to fix such end plates and brackets. But brazed portions cannot withstand high temperature when particulates are burned.

If a three-dimensionally reticulated porous metal (known as "expanded metal") is used as a filter material, which is high in porosity and thus advantageous in reducing pressure loss, welding is impossible with an ordinary welding method such as electric or gas welding.

Even though there is known a special welding method for welding such filter members, the thus welded porous filter members could not stably support each other or other members. The trap formed will thus be low in vibration resistance.

The best way to dispose of particulates trapped is to burn them because by burning particulates, the trap can be used repeatedly. Use of a light oil burner is being considered as a possible means to burn particulates trapped. But now an electric heater is considered to be the most promising means because it is safe and easy to control. Thus, electric heaters are used in many particulate traps, as disclosed in unexamined Japanese patent publications 5-22290, 6-257422, and 6-264722.

In order to efficiently heat the filter, an electric heater having two opposite surfaces may be inserted in a longitudinally recessed exhaust gas incoming space to simultaneously heat two opposite filtering surfaces, as disclosed in unexamined Japanese patent publication 6-257422.

In order to stably support such a heater, the heater may be screwed to a support bar inserted in the exhaust gas-incoming space (defined inside the inner cylinder) together with the heater, as disclosed in the same publication.

Simply by inserting the electric heater between the opposite filtering surfaces, however, it is impossible to stably support the heater. If the heater is thermally expanded and deformed while being energized to such an extent that it contacts the filter, electric leakage may occur. When such a trap is mounted on a vehicle, the heater may come into contact with the filter due to vibration, causing electric leakage. These have been major obstacles to the development of practically usable particulate traps. If electric leakage occurs, it is impossible to burn particulates trapped any more. Since particulates cannot be removed, the exhaust gas resistance will grow gradually with use. In the worst case, the exhaust gas resistance may increase to such a degree that the vehicle engine stops.

In the arrangement in which the heater is screwed to a support bar, a complex insulating structure is needed. Such a structure, made up of a large number of parts, pushes up the cost of the trap. Further, heater-fixing members including the support bar, setscrews, insulators add to the heat capacity of the filter element. Thus, large part of the heat produced by the heater will escape to these fixing members and then to the outside, increasing the heater capacity. Also, regeneration tends to be insufficient around the screwed portions.

FIG. 17 shows a mechanism for supplying oxygen by natural convection to a particulate trap of a type in which the filter is regenerated only while the engine is not running.

The particulate trap shown has a filter element 3 comprising cylindrical filters having different diameters, i.e. an inner cylindrical filter 4 and an outer cylindrical filter 5 concentrically provided around the inner filter 4. End plates 6 are provided to close the opening of the inner cylindrical filter 4 at the exhaust gas incoming end, and the opening between the inner and outer cylindrical filters at the exhaust gas outgoing end. Exhaust gas flows into the space between the inner and outer cylindrical filters 4 and 5 through its inlet, and passes through the filtering portions of the respective cylindrical filters into exhaust gas outgoing spaces defined inside the inner cylindrical filter 4 and outside the outer cylindrical filter 5.

This particulate trap, having a multiple-cylinder type filter element, has a large filtering area. The electric heater 8 inserted between the opposite filtering surfaces as shown can heat the entire filtering areas uniformly and efficiently. It is thus possible to reduce the size of the entire trap and the power consumed by the heater.

In the arrangement shown, in which a case 2 for a conventional single-cylinder type filter having an air inlet 11 through which air is introduced by natural convection and an air outlet 12 is used for a multiple-cylinder type filter, ambient air introduced into the case during filter regeneration cannot be distributed sufficiently into the cylindrical filters. Since sufficient air is not supplied into the filters, particulates cannot be burned smoothly. Regeration thus takes a long time, increasing the power consumption for regeneration. In an extreme case, the filter may not be sufficiently regenerated. An object of the present invention is to provide a particulate trap having none of these problems.

DISCLOSURE OF THE INVENTION

In order to accomplish this object, according to the present invention, the filter element is made from a three-dimensionally reticulated heat-resistant metallic material having pores communicating with each other, because this material is resistant to high-temperature exhaust gas. This filter element comprises two or more cylindrical filters having different diameters from each other and fitted concentrically one inside another to define exhaust gas-incoming and exhaust gas outgoing spaces alternaltely in a diametric direction between the adjacent filters and inside the innermost filter. Such a filter element has a sufficiently large filtering area, and its regeneration life is sufficiently long. Each of the cylindrical filters is compressed so that its portions to be connected to another cylindrical filter or to other parts such as end plates and brackets have 15 volume % or more of metal part. The thus compressed portions are welded to the other filter cylinder or other parts.

A plate-shaped electric heater is mounted in the exhaust gas incoming space for burning particulates trapped. Ceramic insulators may be mounted, spaced from one another, on the heater to support the heater. Each of the insulators is supported on one or both of opposite filtering surfaces defining the exhaust gas incoming space therebetween to hold the heater in position in the filter element.

It is preferable that the insulators used in the present invention can be easily mounted on the heater and cover as small an area as possible of the filtering surfaces. We will explain specifically how the insulators are shaped and mounted on the heater for this purpose in the description of the preferred embodiments.

For a particulate trap of a type in which filter regeneration is carried out while the engine is not running, a natural convection type fresh air introducing passage is formed in the filter case mounted in an exhaust gas line to extend from outside the case into the multiple-cylinder filter housed in the case.

By compressing the filter material to form portions having 15 vol % or more metal part, such compressed portions can be connected to each other or to other members such as end plates and brackets by ordinary welding method such as electric welding, gas welding or laser welding. The filter element can thus be manufactured easily at a low cost.

By this method, it is also possible to manufacture a bag-shaped filter element, in the manner to be described in the description of preferred embodiments. Since such a bag-shaped filter element needs no end plates, it is lighter in weight (lower in heat capacity), and needs less energy for burning particulates (low heater power).

Since parts of the filter elements are joined together by welding, no gap is formed in the connecting interface, so that exhaust gas will not leak except the filtering portion.

Since the filter connecting portions are compressed and thus high in strength, the filter is less likely to be destructed by vibration. That is, the filter is resistant to vibration. Also, since the connecting portions are compressed and high in strength, it is possible to cantilever-support the filter element with a bracket provided at one end. Cantilever-supporting permits thermal expansion and shrinkage of the filter element, eliminating the possibility of damage or breakage of the filter element due to differences in thermal expansion during filter regeneration.

Ceramic insulators are mounted on the heater and supported on opposite filtering surfaces of the filter to keep the heater in position in the filter element. The insulators thus prevent displacement of the heater, and the conductive portion of the heater from coming into contact with the filter element, thereby preventing deformation of the heater due to thermal expansion and electric leakage.

Since the insulators are supported on the filter, any heat conducted to the insulators while the heater is energized is conducted 100% to the filter. Thus, the filter can be heated with maximum efficiency and minimum power consumption.

Since the insulators are arranged spaced from one another, heat capacity distribution is uniform, so that particulates trapped can be burned uniformly. This improves the filter regeneration rate and extends the regeneration life.

For the type of diesel engine particulate trap in which filter regeneration is carried out while the engine is not running, by introducing fresh air into the multiple-cylinder filter, it is possible to eliminate portions where oxygen supply is extremely low, so that it is possible to burn particulates efficiently over the entire filtering area. It is also possible to reduce the total amount of air introduced into the filter for regeneration, which means that less heater-produced heat escapes into the atmosphere.

It is thus possible to reduce the power consumed by the heater, shorten the regeneration time, and improve the regeneration rate.

BRIEF DESCRIPTION OF THE DRAWINGS

FIGS. 9A–9E are perspective views of various columnar insulators.

FIG. 10A–10C are plan views of columnar insulators showing the state when they have been mounted in position.

FIGS. 15A to 15F are views showing ring-shaped insulators having different sectional shapes.

BEST MODE FOR EMBODYING THE INVENTION (First Embodiment)

Figure 1A:
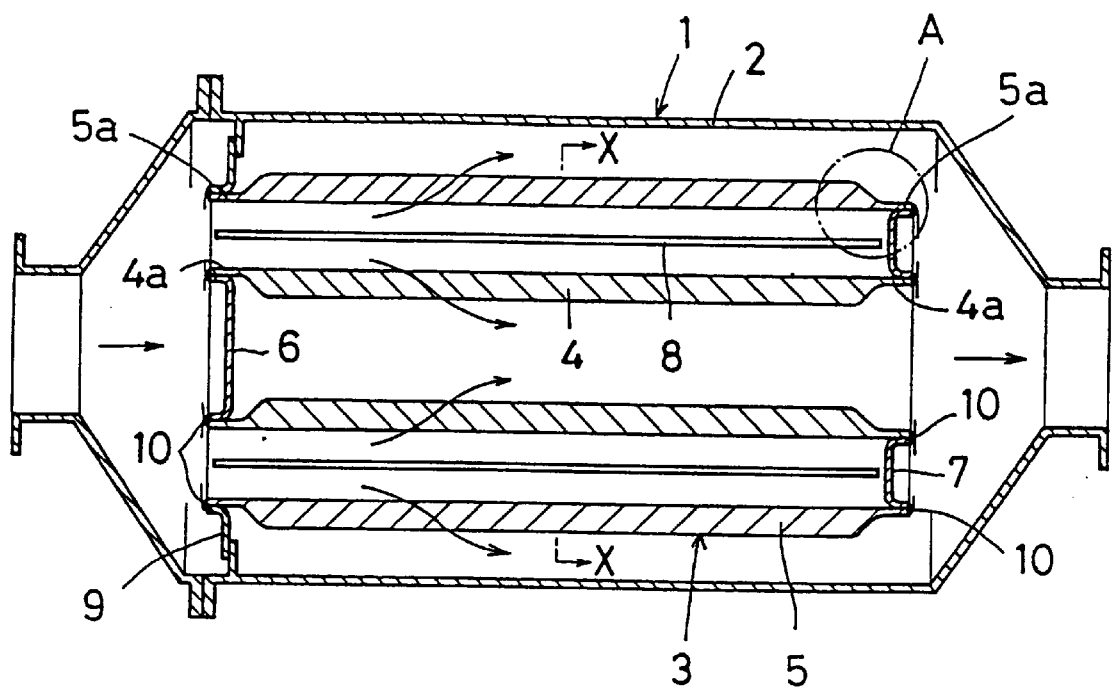
FIG. 1A is a vertical sectional view of a first embodiment.
Figure 1B:
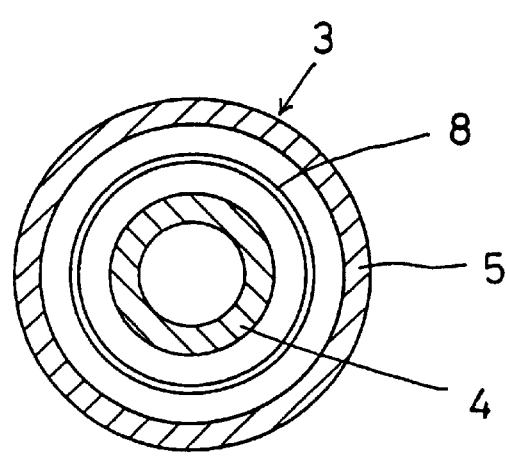
FIG. 1B is a section along line X—X of FIG. 1A.
Figure 1C:
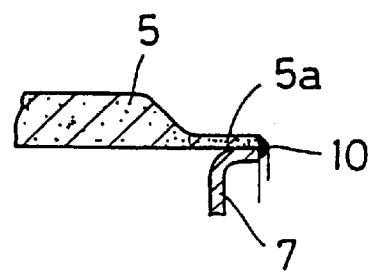
FIG. 1C is an enlarged view of the portion A in FIG. 1A.

FIG. 1 shows a first embodiment of the particulate trap according to the invention. This particulate trap 1 comprises a metallic case 2 mounted in an exhaust gas line, and a filter element 3 housed in the case 2.

The filter element 3 includes concentrically arranged inner and outer cylinders 4 and 5 both made from a three-dimensionally reticulated, porous heat-resistant metallic material (e.g. CELMET made by SUMITOMO ELECTRIC INDUSTRIES, LTD.) having pores that communicate with each other. End plates 6 and 7 close the opening of the inner cylinder 4 at the exhaust gas incoming end and the opening between the inner and outer cylinders 4 and 5 at the exhaust gas outgoing end, respectively. A heater 8 for burning particulates trapped is mounted in the space between the inner and outer cylinders 4 and 5. A bracket 9 mounted on the outer surface of the outer cylinder 5 near its exhaust gas incoming end is fixed to the case 2 to seal the space between the case 2 and the outer cylinder 5 and also to support the entire filter element in a cantilever fashion.

Each of the inner and outer cylinders 4, 5 has both ends compressed so that a 15 volume % or more metallic portion is formed at either end. The brackets 9 and the end plates 6, 7 are secured to these compressed ends 4a, 5a by welding (as shown at 10 in FIG. 1). Although this trap is easy to manufacture, no gap that can cause gas leakage will be formed at joint portions between the end plates or bracket and the inner and outer cylinders. Since the compressed ends are high in strength, the filter element 3 can be stably supported though in a cantilever manner.

If the inner and outer cylinders 4, 5 were not compressed, it would be difficult to weld the end plate 6, 7 and bracket 9 to the cylinders. Even if they were welded, the filter element would be liable to be deformed or broken at the weld portions by its own weight. Such a filter element is thus extremely low in vibration resistance. In the arrangement of FIG. 1, the compressed ends of the cylinders have improved strength, so that the filter element is sufficiently vibration-resistant.

(Second Embodiment)

Figure 2A:
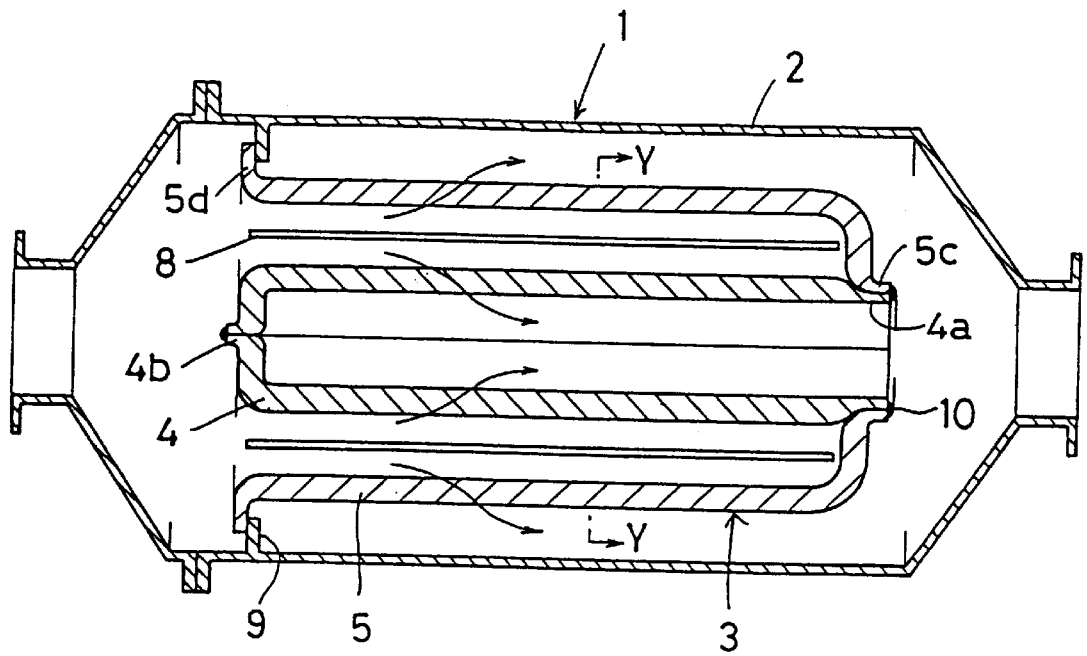
FIG. 2A is a vertical sectional view of another embodiment.
Figure 2B:
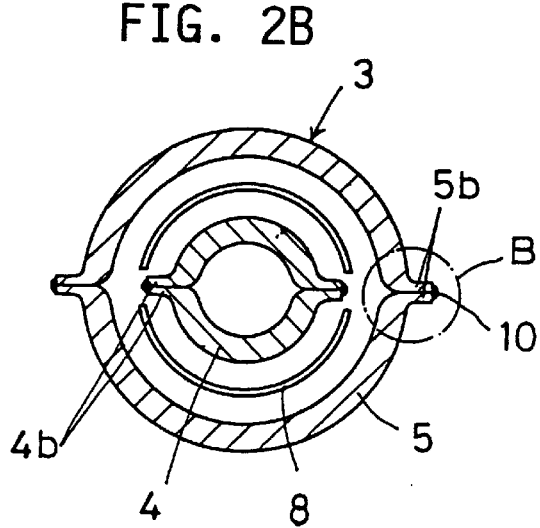
FIG. 2B is sectional view along line Y—Y of FIG. 2A.
Figure 2C:
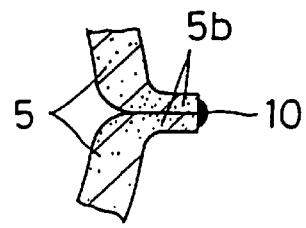
FIG. 2C is an enlarged view of the portion B in FIG. 2B.
Figure 3:
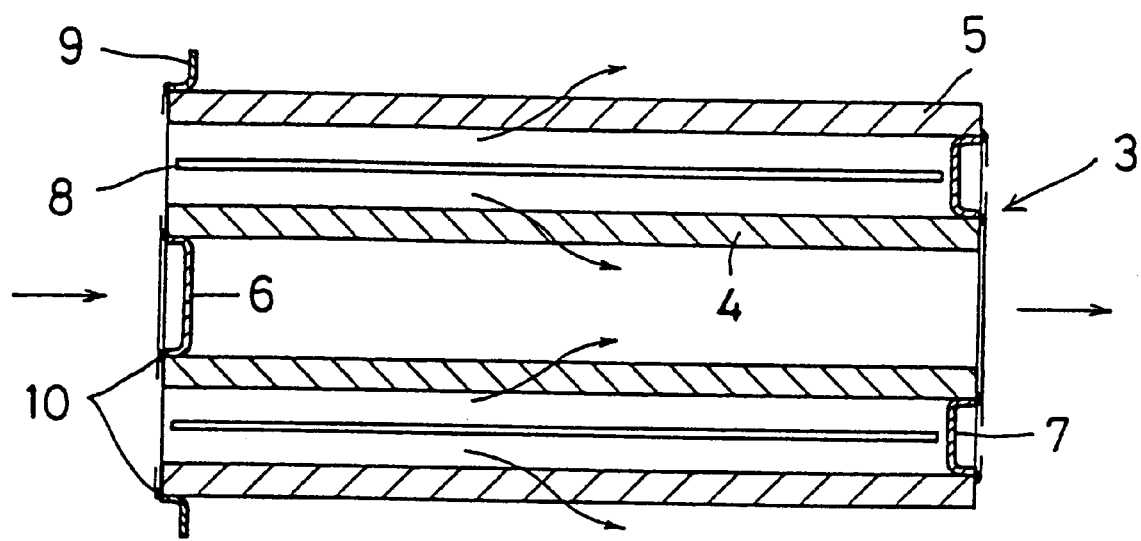
FIG. 3 is a vertical sectional view of a filter element (as a control) in which the welded portions are not compressed.

FIG. 2 shows the second embodiment. The particulate trap 1 of this embodiment has bag-shaped inner and outer cylinders 4, 5 made of the abovesaid material. No end plates are used. The inner and outer cylinders each comprise two split halves having flanges 4b and 5b that are abutted and welded together. The flanges 4b, 5b are compressed so that they have 15 volume % or more metal portion. The inner and outer cylinders 4, 5 are coupled together by welding the compressed portion 4a at one end of the inner cylinder 4 to a compressed flange 5c formed on the outer cylinder 5. The filter element 3 is supported in a cantilever fashion by directly welding a flange 5d formed integrally on the outer surface of the outer cylinder 5 at one end to a bracket 9 formed on the inner surface of the case 2.

The trap of this embodiment, having no end plates, is made up of a smaller number of parts and thus can be manufactured at a lower cost. The filter element is lightweight too, so that it can be more stably cantilever-supported. Since there is no increase in heat capacity of the filter element due to the provision of end plates, particulates trapped can be burned with lesser heater calorie. The power consumption is thus smaller, so that it is possible to use a smaller battery. The filter life extends too.

The filter element 3 of these embodiments is made up of two cylindrical filters, but the number of such filters may be more than two. The filter element may be supported at both ends by providing an additional support at the end opposite to the bracket 9. Such an additional support should be axially slidable along the inner surface of the case 2, because with this arrangement, no axial stress due to thermal expansion will act on the filter element, in the same manner as when the filter element is supported in a cantilever manner.

(Third Embodiment)

Figure 4:
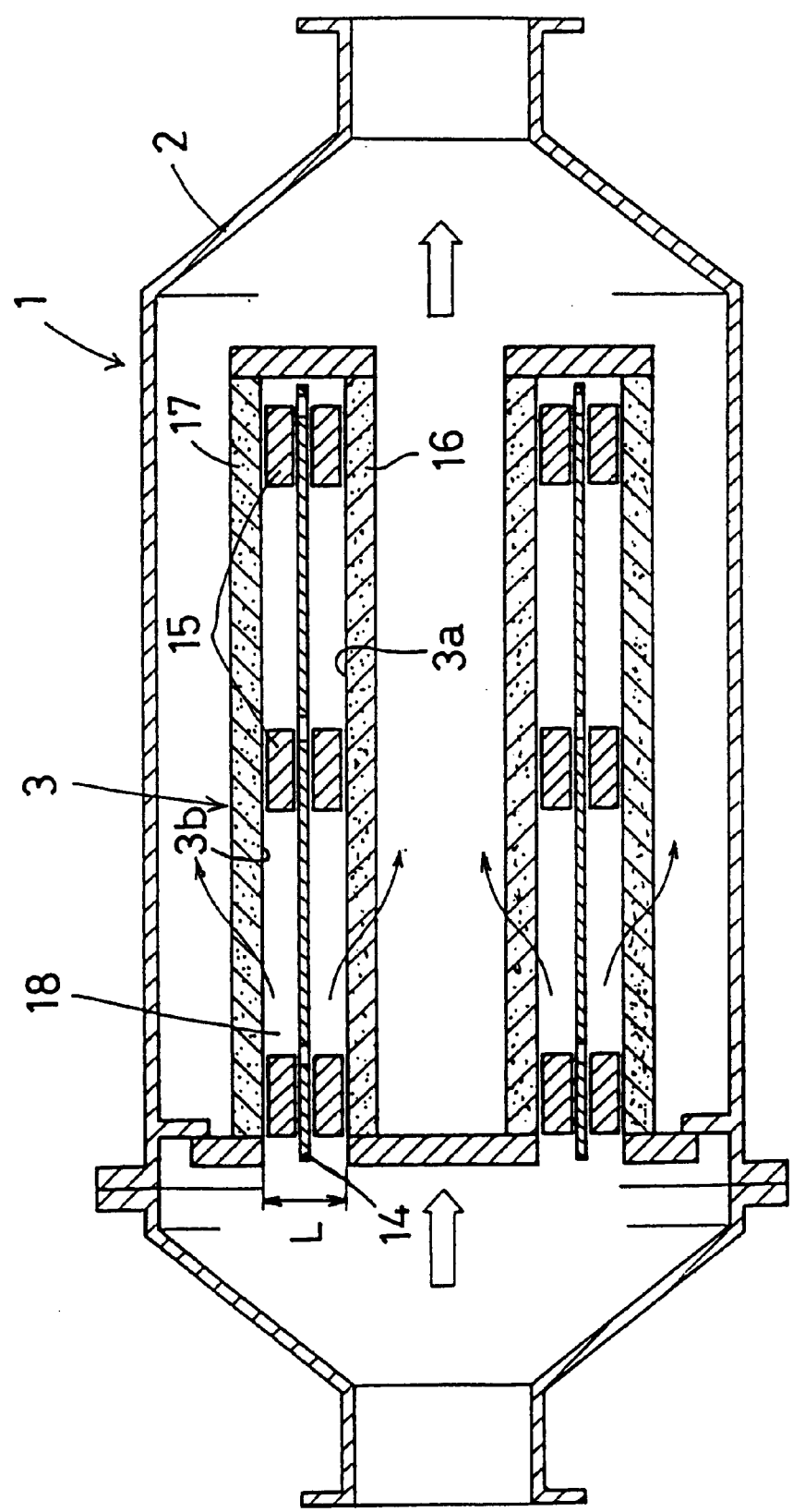
FIG. 4 is a sectional view of a first embodiment of the particulate trap of the present invention.

FIG. 4 shows the third embodiment of the particulate trap according to the present invention. This particulate trap 1 comprises a metallic case 2 mounted in an exhaust gas line, and a filter element 3 housed in the case 2 together with plate-shaped heaters 14 and heater-supporting insulators 15.

The filter element 3 is made from a three-dimensionally reticulated, porous, heat-resistant metallic material (e.g. CELMET made by SUMITOMO ELECTRIC INDUSTRIES, LTD.) having pores communicating with each other. In this embodiment, the filter element comprises two concentrically arranged inner and outer cylindrical filters 16 and 17. Closure members such as end plates close the opening of the inner cylinder 16 at the exhaust gas incoming end and the opening between the cylinders 16 and 17 at the exhaust gas outgoing end to define an annular exhaust gas incoming space 18 extending in the longitudinal direction of the filter element between the cylinders 16 and 17. But instead, the element may comprise a strip of filter member that is bent alternately at one and the other ends to define flat exhaust gas incoming spaces between the adjacent walls of the filter strip.

Figure 5:
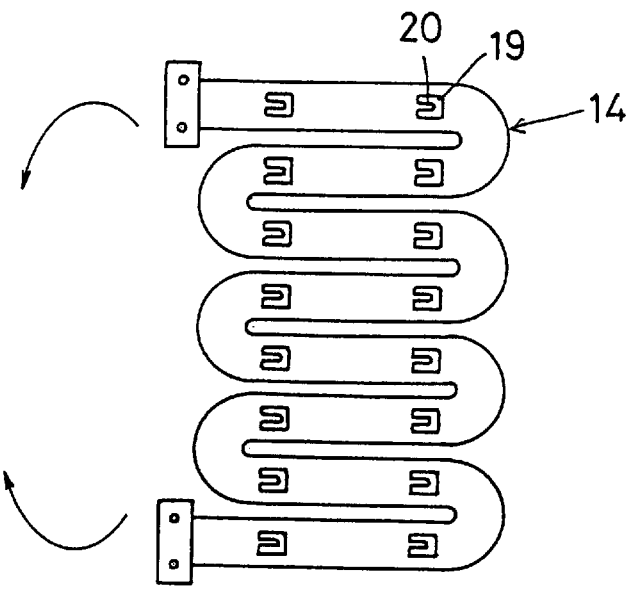
FIG. 5 is a developed plan view of a plate-shaped heater.
Figure 6A:
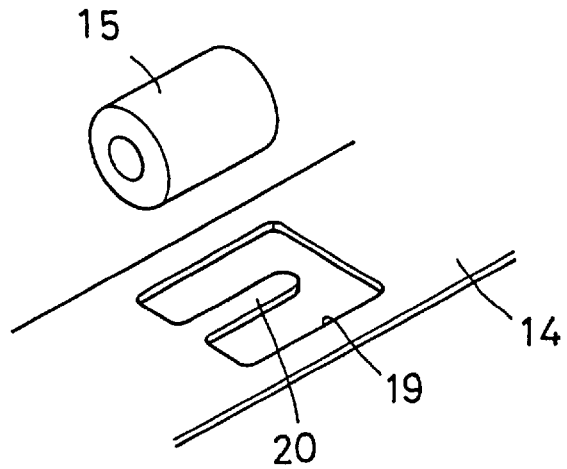
FIG. 6A is a perspective view showing a hole in the heater and an insulator.

As shown in FIG. 5, the heater 14 is a strip member extending in a meandering pattern. It is rolled cylindrically and inserted in the exhaust gas incoming space 18. Holes 19 are formed at both ends of each straight portion of the meandering heater. As shown in FIG. 6A, each hole 19 has at its center a tongue 20 which can be bent up and down. An insulator 15 is mounted on the tongue 20 of each hole 19.

Figure 6B:
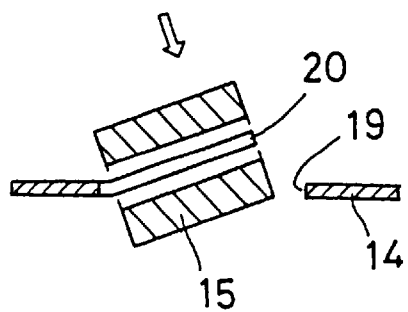
FIG. 6B is a view showing the state while the insulator is being mounted.

Each insulator 15 is a cylindrical ceramic member. To mount such an insulator as shown in FIG. 6B, the tongue 20 of each hole 19 is bent and inserted into the hole of the insulator 15, and then the lower half portion of the insulator 15 is pushed into the hole 19. The insulator 15 is maintained in this position by the tongue 20, which is now straightened. The insulators 15 have an outer diameter substantially equal to the distance L between the opposite filtering surfaces 3a and 3b of the filter element, so that the insulators 15 are held between the filtering surfaces 3a, 3b, thus insulating the heater 14 from the filters.

Since the insulators 15 are mounted in the longitudinal direction of the heater, their surface area that blocks the flow of exhaust gas is kept to a minimum. Also, since the insulators 15 are in line contact with the filter element 3, they scarcely cover and reduce the filtering area.

Figure 6C:
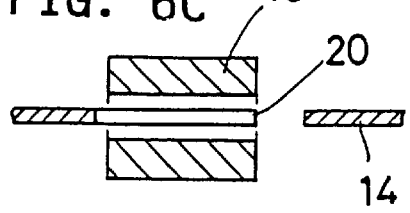
FIG. 6C is a sectional view of the insulator mounted.
Figure 7A:
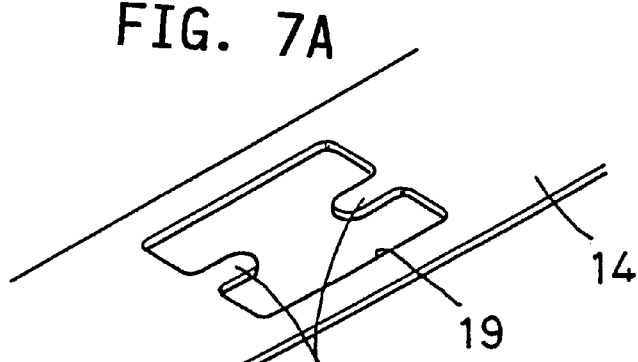
FIG. 7A is a perspective view of a different hole formed in the heater.
Figure 7B:
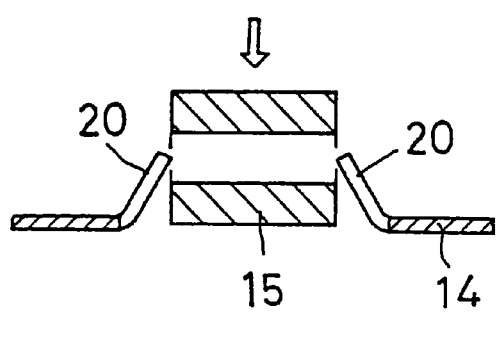
FIG. 7B shows the state while an insulator is being mounted.
Figure 7C:
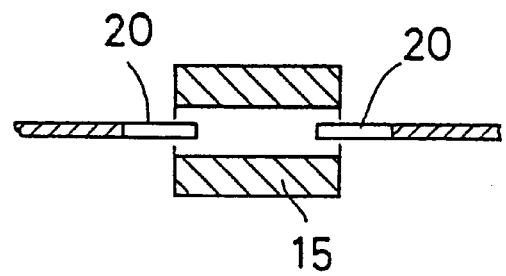
FIG. 7C is a sectional view of the insulator mounted.

FIG. 7 shows a different type of hole 19, which has two tongues 20 provided opposite to each other. The tongues 20 are inserted into the hole of each insulator from both ends. Since the insulator is held at both ends, rather than at only one end as in the arrangement of FIG. 6, it can be supported more stably.

(Fourth Embodiment)

Figure 8:
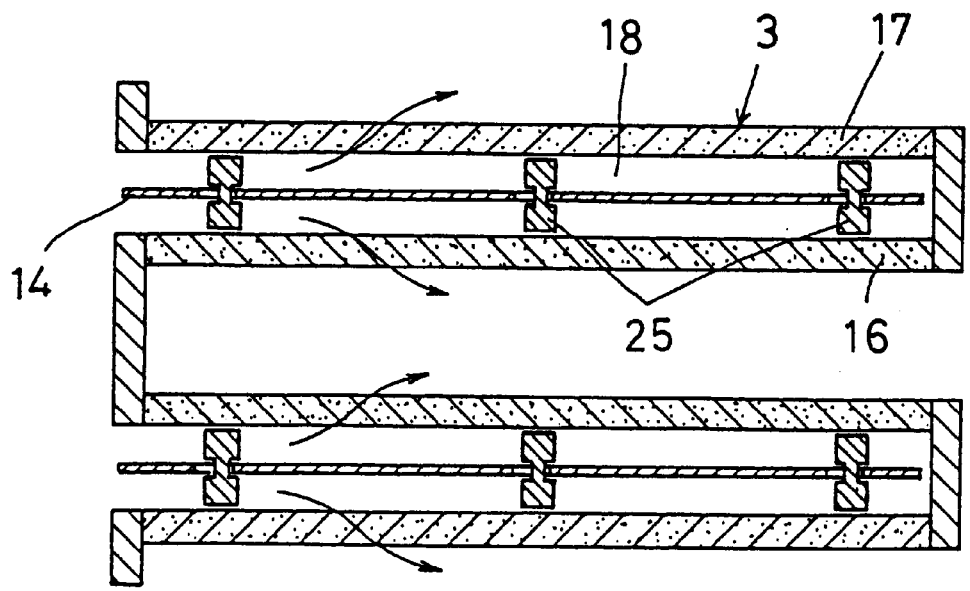
FIG. 8 is a section of a second embodiment (the case not shown).

FIG. 8 shows the fourth embodiment with the case omitted. This particulate trap differs from the third embodiment in the shape of the ceramic insulators 25 and the way in which the insulators 25 are mounted on the heater 14.

The insulators 25 are columnar members having a height H substantially equal to the distance L and having a narrow part 25b in the center with respect to the height direction. The heads 25a and the narrow part 25b of each insulator 25 may have a circular, triangular, quadrangular or any other polygonal section. The apex of each head may be flat as shown in FIGS. 9A and 9C, spherical as shown in FIG. 9B, semicylindrical as shown in FIG. 9D, or chevron-shaped as shown in FIG. 9E.

Figure 11A:
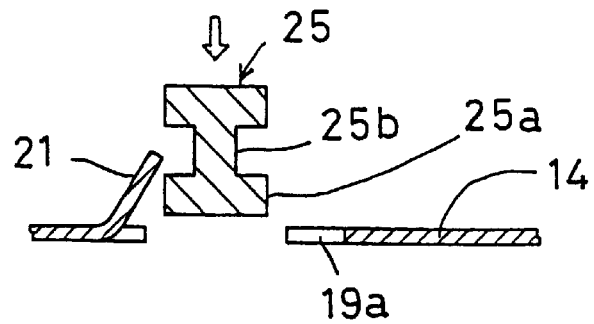
FIG. 11A shows the state while a columnar insulator is being mounted.
Figure 11B:
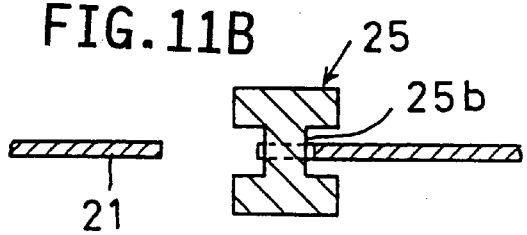
FIG. 11B shows the state when it has been mounted.

As shown in FIG. 10, the holes 19 are shaped and sized such that the head 25a can be pushed into and pulled out of them, and have a groove 19a and a tongue 21. As shown in FIG. 11A, with the tongue 21 raised, one of the heads 25a of each insulator 25 is pushed into the hole 19, and then the entire insulator 25 is moved laterally until the narrow part 25b engages the edge of the groove 19a as shown in FIGS. 10 and 11. In this state, the tongue 21 is allowed to move back to the original position to prevent the insulator 25 from being pushed out of the groove 19b and thus from coming out of the hole 19. This embodiment operates in substantially the same manner to achieve substantially the same results as the third embodiment.

(Fifth Embodiment)

Figure 12:
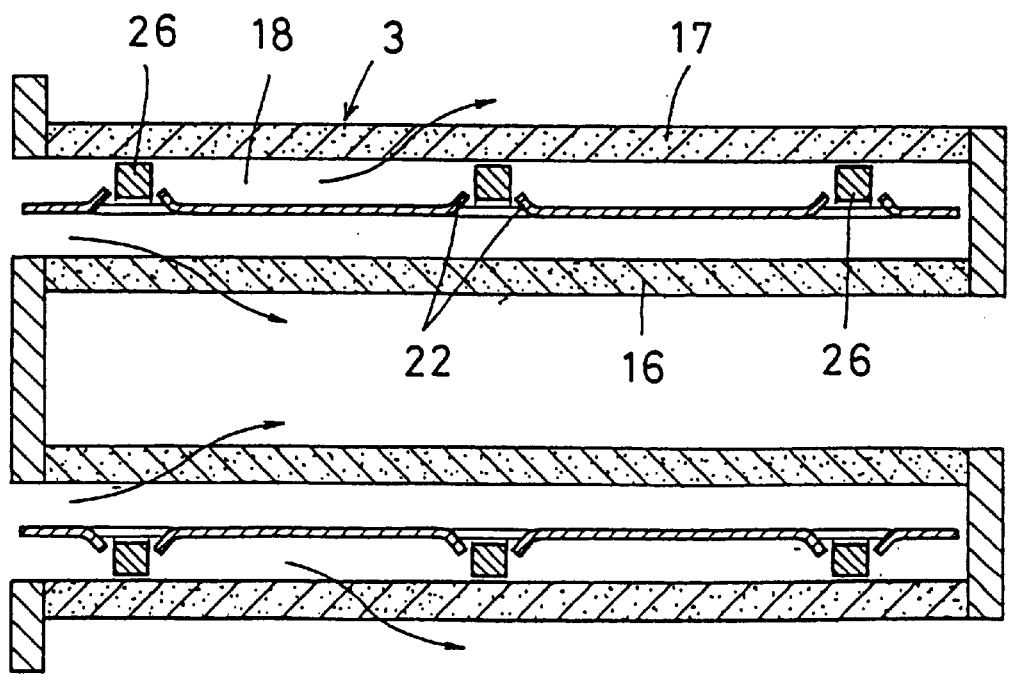
FIG. 12 is a sectional view of a third embodiment (no case).

FIG. 12 shows the fifth embodiment. This particulate trap, the case being omitted from the figure, has ring-shaped ceramic insulators 26 having an outer diameter substantially equal to the inner diameter of the outer cylinder 17 and mounted on the outer periphery of a cylindrically rolled heater 14. Cut-and-raise nails 22 provided opposite to each other on the heater 14 engage the insulators 26 to prevent the insulators from coming off the heater.

Figure 13:
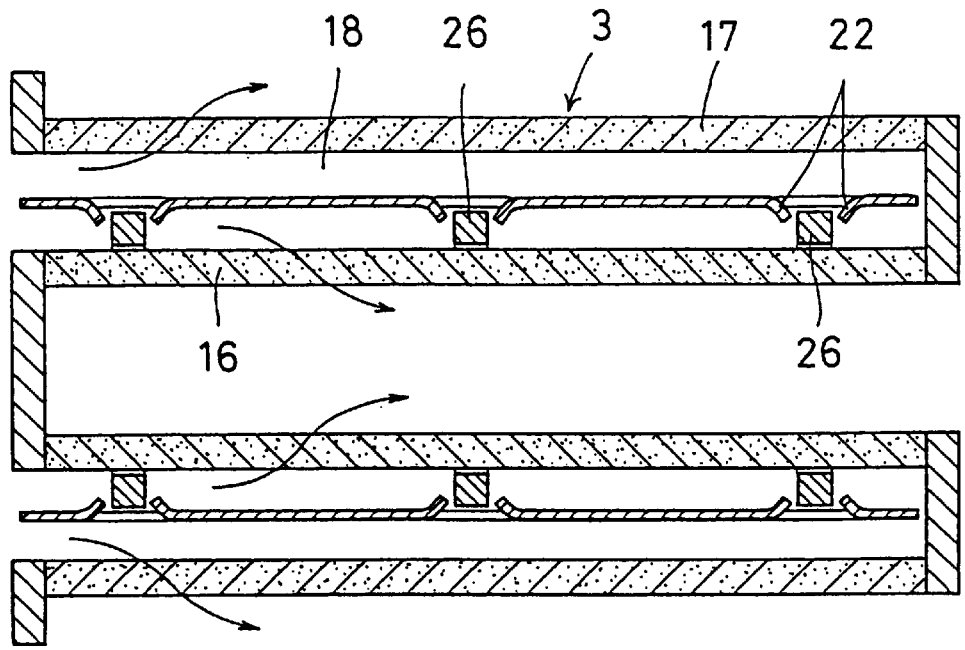
FIG. 13 is a sectional view of an example in which ring-shaped insulators are mounted on the inner side of a heater.
Figure 14:
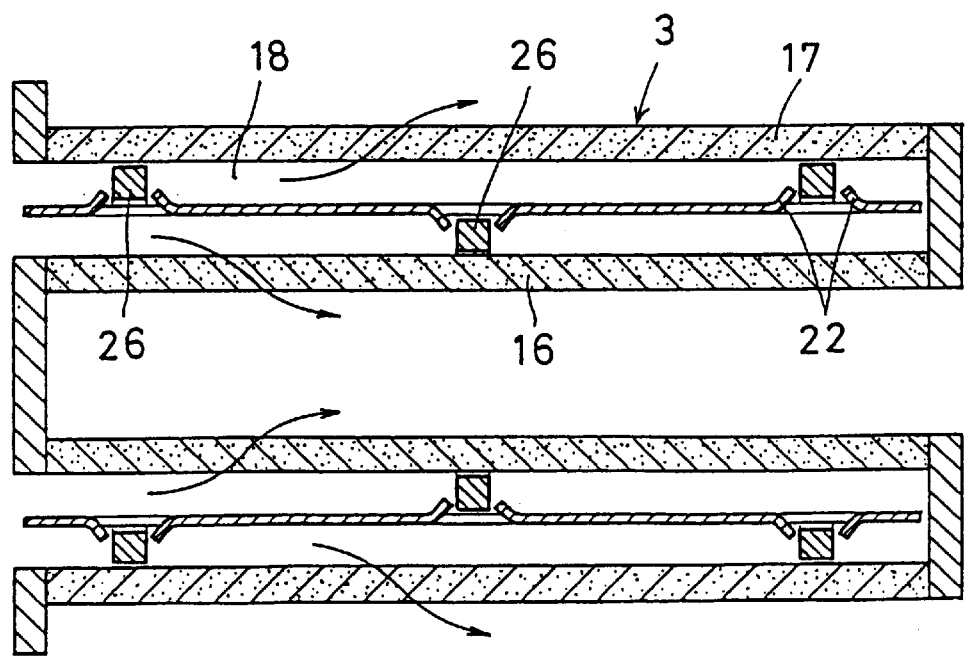
FIG. 14 is a sectional view of an example in which ring-shaped insulators are mounted on the inner and outer sides of the heater in a staggering pattern.

Alternatively, as shown in FIG. 13, ring-shaped insulators 26 having an inner diameter substantially equal to the outer diameter of the inner cylinder 16 may be mounted on the outer surface of the inner cylinder 16. Also, as shown in FIG. 14, the ring-shaped insulators 26 of FIGS. 12 and 13 may be arranged in a staggered pattern to support the inner and outer surfaces of the heater 14. The ring-shaped insulators 26 may have a square, trapezoidal or circular section, or a section including a semicircular portion on the side in contact with the filter, as shown in FIGS. 15A–15F. Cutouts may be formed along the edges to permit passage of exhaust gas.

The structures shown in FIG. 12 and the following figures make it possible to construct the trap from a smaller number of parts, but are applicable only to traps of the type in which the filter element comprises a plurality of cylindrical filters inserted one inside another.

(Sixth Embodiment)

Figure 16A:
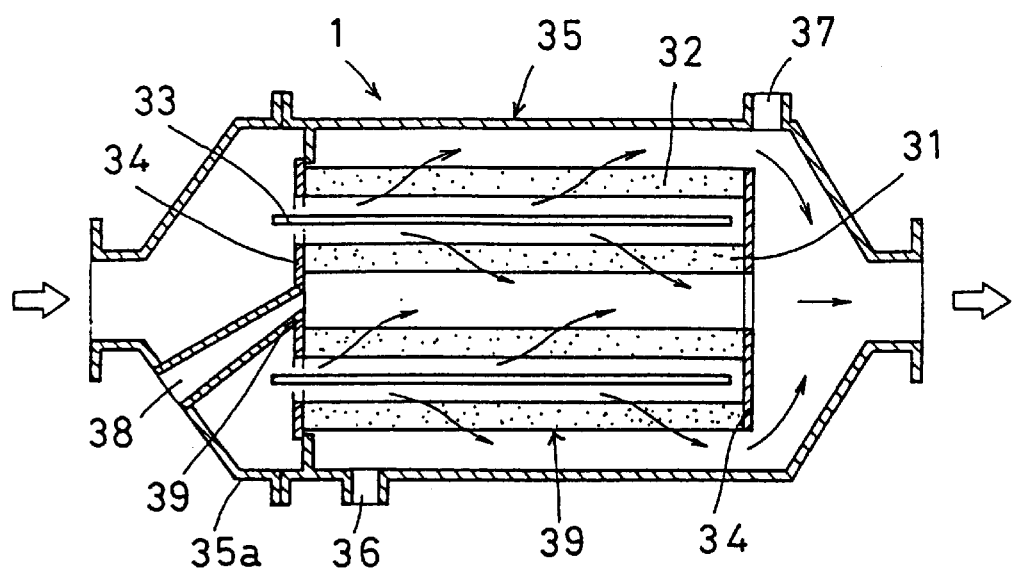
FIG. 16A is a sectional view of an example of the particulate trap of the present invention.
Figure 16B:
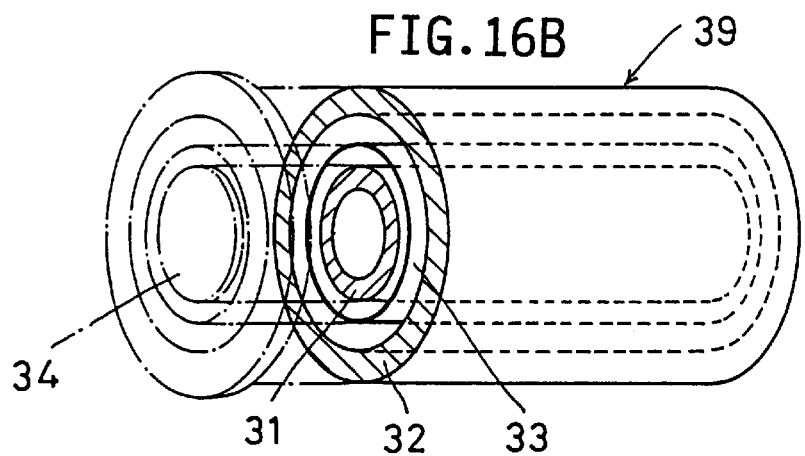
FIG. 16B is a perspective view of a filter element used in the trap of FIG. 16A.
Figure 16C:
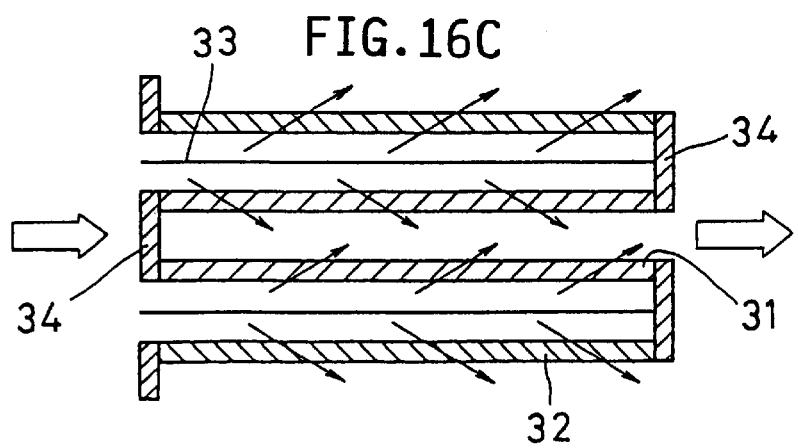
FIG. 16C is a sectional view of the filter element.

FIG. 16 shows the sixth embodiment of the particulate trap for a diesel engine according to the present invention. This particulate trap has inner and outer cylindrical filters 31 and 32 formed from a heat-resistant metallic filter material. The inner and outer cylindrical filters 31, 32 are mounted concentrically as shown in FIG. 16B, and an electric heater 33 is inserted between the filters 31 and 32. The filter element 39 thus formed is mounted in an external case 35 shown in FIG. 16A. FIG. 16C shows a section of this heater-equipped filter element 39.

Exhaust gas is introduced into the space between the inner cylindrical filter 31 and the outer cylindrical filter 32, passes through the inner and outer cylindrical filters 31, 32, and flows into the space inside the inner cylindrical filter 31 and outside the outer cylindrical filter 32. To form such a flow of exhaust gas, the opening of the inner cylindrical filter 31 at the exhaust gas incoming end and the opening between the inner and outer cylindrical filters at the exhaust gas outgoing end are closed by end plates 34 fixed to the inner and outer cylindrical filters.

The external case 35 is formed with the abovementioned air inlet 36 and air outlet 37 through which fresh air can be supplied to the outside of the filter element 39 by natural convection.

A detachable cover 35a has a fresh air introducing pipe 38 extending from outside the filter into the inner cylindrical filter 31. The introducing pipe 38 is inserted into a hole formed in the end plate 34 closing the opening of the inner cylindrical filter 31 when the cover 35a is mounted on the case 35.

The fresh air introducing pipe 38 should be provided at the exhaust gas incoming end as shown. This is because if provided at the exhaust gas outgoing end, it would impair smooth flow of filtered exhaust gas in the inner cylindrical filter 31. The air introducing pipe 38 should be arranged such that its inlet is located lower than its outlet so that air can be smoothly introduced into the filter by natural convection.

The electric heater 33 may be formed by punching an inconel plate so that the heating circuit is bent alternately at one and the other ends, adjusting its resistivity, and cylindrically shaping. This heater is heated directly by energizing. Otherwise, the heater may be one comprising a cylindrical heating medium made of punching metal, expanded metal, wire gauze, or porous metal, and a sheath heater wound around the heating medium.

Such heaters can be positioned opposite to the entire filtering surfaces, so that the filter can be heated efficiently.

The filter element used may be one comprising more than two cylindrical filters having different diameters and arranged concentrically one inside another.

(Seventh Embodiment)

Figure 18:
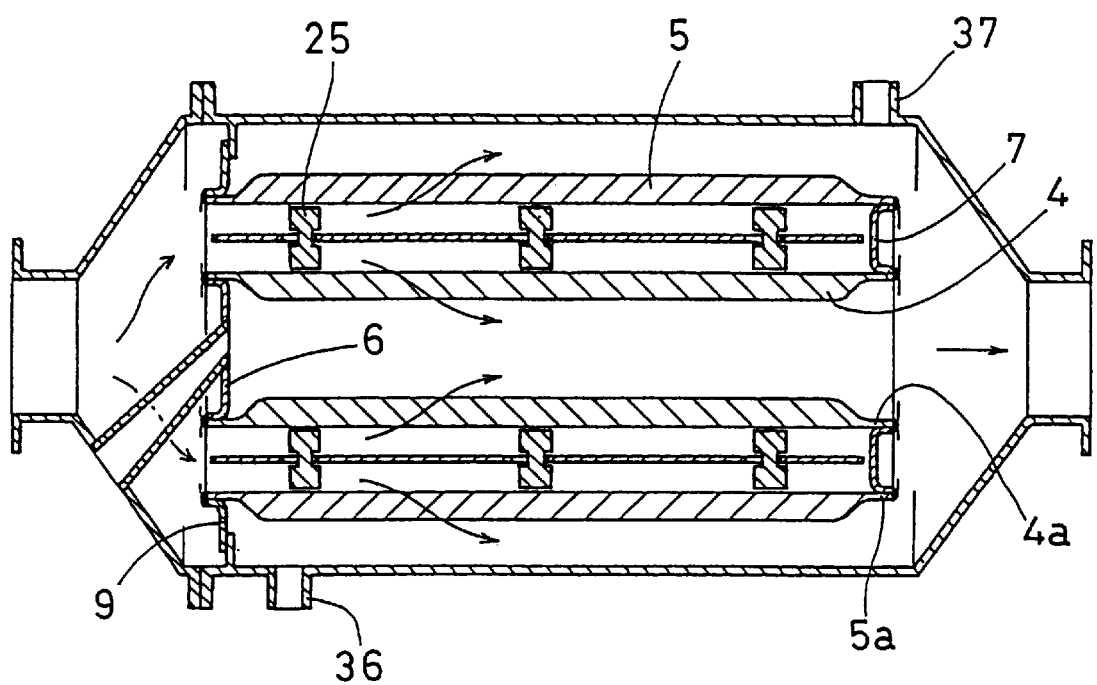
FIG. 18 is a vertical sectional view of a seventh embodiment according to the present invention.

FIG. 18 shows the seventh embodiment. This embodiment has all of the aforementioned three important features of the present invention, which is: 1) the end plates 6, 7 and the bracket 9 are welded to the compressed portions 4a, 5a of the inner and outer cylinders 4 and 5; 2) the heater-supporting ceramic insulators 25 are mounted at spacings on the heater 14; and 3) the fresh air introducing pipe 36 is provided to extend from outside the case into the filter element housed in the case and comprising a plurality of concentrically arranged cylindrical filters.

More detailed embodiments are described below.

Figure 19:
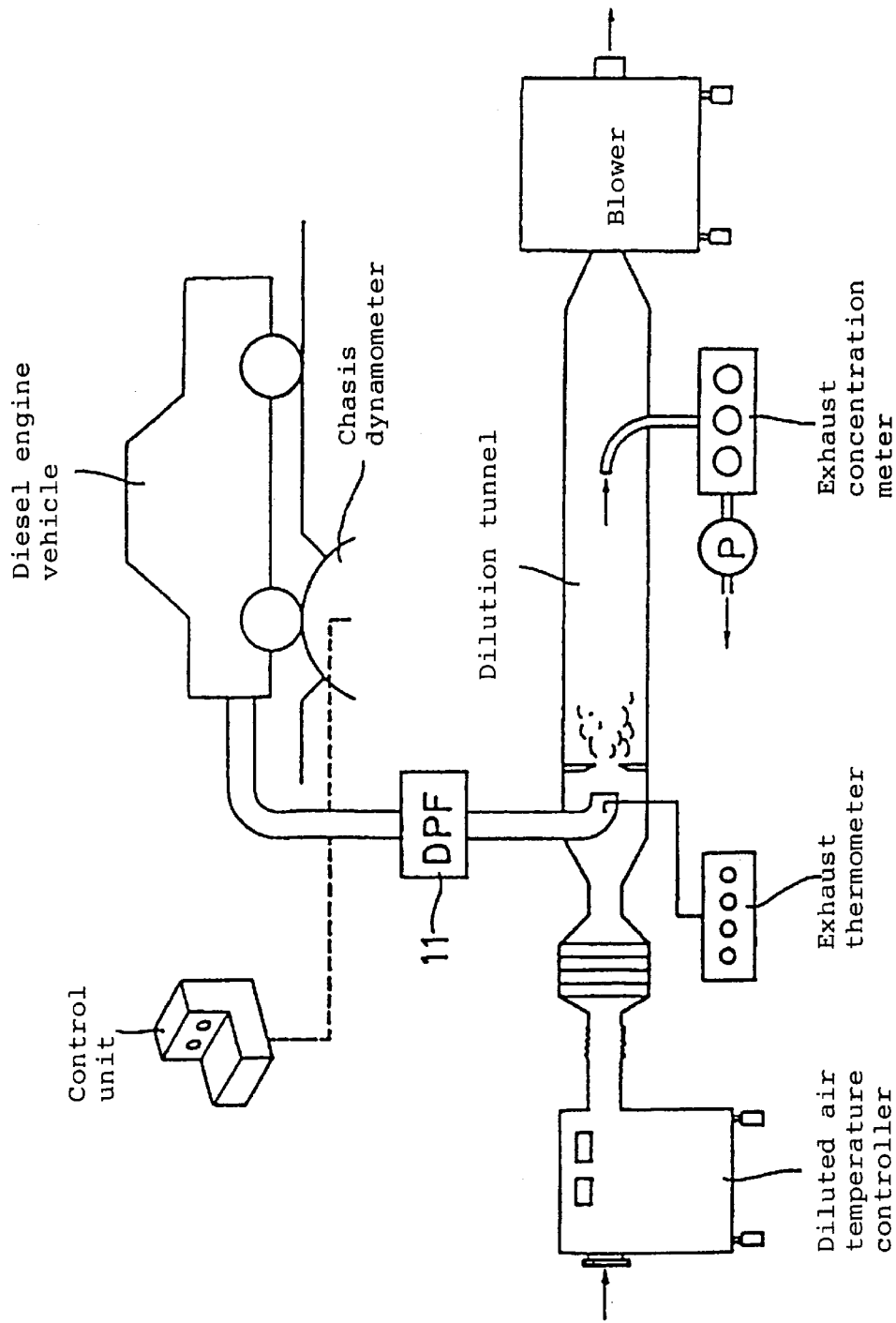
FIG. 19 is a schematic view of an experiment device used in evaluating regeneration performance.

FIG. 19 shows an experiment device used for performance evaluation of test specimens. This device comprises a 3400 cc, four-cylinder, direct-injection diesel engine vehicle, and a chassis dynamometer. Particulate traps to be tested are connected to the tail pipe as shown.

An inner and an outer cylindrical filter were formed from a material obtained by Ni-Cr-alloying an Ni-based three-dimensionally reticulated porous member (CELMET made by SUMITOMO ELECTRIC INDUSTRIES, LTD.), and the thus formed cylindrical filters were fitted one inside the other to provide a filter element 39 shown in FIG. 16. The heater 33 was formed by punching an inconel plate, adjusting its resistivity, and cylindrically shaping it. This heater is a type heated by directly energizing it.

Figure 17:
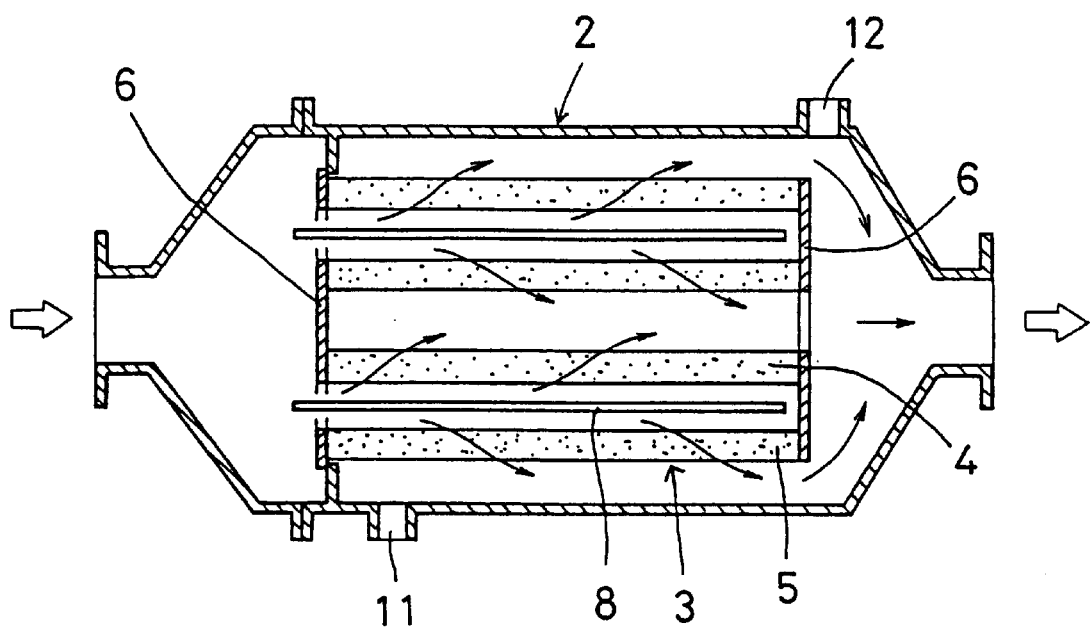
FIG. 17 is a sectional view of a particulate trap before being improved according to the present invention.

A plurality of such heater-equipped filter elements 39 were prepared and housed in cases 35 as shown in FIG. 16A. The particulate traps thus obtained are hereinafter referred to as Examples or Articles of the invention. The same type of filter elements 39 were housed in cases 35 for single filters as shown in FIG. 17 to obtain particulate traps for comparison.

With each test specimen mounted on the experiment device shown in FIG. 19, the diesel engine was run at 1800 rpm under ¼ load. When 1.5 g particulates were accumulated (trapped) on the filter, the engine was cut.

The heater 33 was then energized from a constant-voltage power source to burn particulates trapped with natural convection of air sustained. Heater power and regenerating time are shown in Table 1. After this test, the filters were observed to check how they were regenerated. The filter regeneration rates are given in terms of differential pressure recovery rates, which are calculated as follows:

Differential pressure recovery rate=$\{1-A/B\}\times 100\%$

A=(differential pressure of filter after regeneration)−(differential pressure before trapping)

B=(differential pressure of filter after trapping)−(differential pressure of filter before trapping)

The results are shown in Table 1.

As will be apparent from the results of the experiment, Articles of the invention were higher in regeneration rate than Articles for comparison even when the heater power and the regeneration time were both half those for Articles for comparison. More particularly, the regeneration rate for Example 3 of the invention was as high as 82% with the heater power at 300 W and the regeneration time of 7 minutes, compared with only 5% for Comparison Example 4. It will thus be apparent that the filter according to the invention can be regenerated sufficiently even if the capacity of the car battery is small.

Industrial Application

As described above, the particulate trap according to the present invention has a filter element comprising a plurality of cylindrical filters fitted one inside another and made from a three-dimensionally reticulated heat-resistant metal. Portions of each filter at which the filter is welded to another filter or other parts are compressed so that these portions have a metal density higher than a predetermined value. With this arrangement, it is possible to completely prevent leakage of exhaust gas with a simple structure. Such a filter element thus obtained is high in its ability to trap particulates and regenerate filters and can be manufactured at a low cost.

The compressed portions of the filters are high in strength, so that the filter element maintains necessary vibration resistance even when it is cantilever-supported to avoid stress due to differences in thermal expansion. Overall performance of the trap, including durability, cost, power consumption during regeneration, is thus high.

Since the plate-shaped electric heater is inserted in the longitudinally recessed, exhaust gas incoming space defined in the filter element and supported on the opposite filtering surfaces of the filter element through the ceramic insulators mounted on the heater, it is possible to prevent electric leakage due to unstable support of the heater.

Heat produced by the heater is conducted to the filter element through the insulators and used efficiently to burn particulates trapped. It is thus possible to minimize the escape of heat, so that particulates trapped can be burned with a minimum power consumption.

Since heat escape is minimum, and no extreme local heat loss occurs, heat can be distributed uniformly over the entire area of the filter, so that particulates trapped on the filter can be burned uniformly. Thus, the filter can be regenerated efficiently.

For a particulate trap of the type adapted to be regenerated while the engine is at a stop, the fresh air introducing passage is formed in the case housing a multiple-cylinder filter element to introduce fresh or open air into the filter element by natural convection. Fresh air introduced accelerates burning of particulates over the entire area of the filtering surface and simultaneously reduces the overall amount of fresh air needed, thereby reducing escape of heat produced by the heater. It is also possible to reduce the power consumption of the heater, shorten the regenerating time, and improve the regenerating rate.

TABLE 1

|  | Case structure | Heater power (W) | Regeneration time (min) | Regeneration rate (%) |
|---|---|---|---|---|
| Example 6 (1) | FIG. 16A | 400 | 10 | 100 |
| Example 6 (2) | FIG. 16A | 400 | 5 | 93 |
| Example 6 (3) | FIG. 16A | 300 | 7 | 82 |
| Comparative example 1 | FIG. 17 | 800 | 10 | 91 |
| Comparative example 2 | FIG. 17 | 400 | 10 | 40 |
| Comparative example 3 | FIG. 17 | 400 | 5 | 20 |
| Comparative example 4 | FIG. 17 | 300 | 7 | 5 |

We claim:

1. A particulate trap for use in a diesel engine comprising a case mounted in an exhaust gas line of the diesel engine, and a filter element mounted in said case and made from a three-dimensionally reticulated heat-resistant metallic material having pores communicating with each other, said filter element comprising at least two cylindrical filters having different diameters from each other and fitted concentrically one inside another to define exhaust gas incoming and exhaust gas outgoing spaces alternately in a diametric direction between said adjacent filters and inside the inner most filter, and said particulate trap further comprising a plate-shaped electric heater mounted in said exhaust gas incoming space for burning particulates trapped, each of said cylindrical filters being compressed to a metal volume of at least 15 percent at axial end connecting portions only at its axial end, said compressed connecting portions being welded between filter materials, to an end plate sealing member between the filters, or to a bracket connecting the filters to the case, said compressed filter portions being non-porous.

2. A particulate trap as claimed in claim 1 further comprising ceramic electric insulators mounted, spaced from one another, on said heater for supporting said heater, each of said electric insulators being supported on at least one of opposite filtering surfaces defining said exhaust gas incoming space therebetween to hold said heater in position in said filter element.

3. A particulate trap as claimed in claim 2 wherein said electric insulators are cylindrical members having a diameter substantially equal to the distance between said opposite filtering surfaces, said heater being formed with holes each having a bendable tongue, each of said cylindrical electric insulators being mounted on said heater by fitting said each insulator in each of said hole with its axis extending in the longitudinal direction of said heater, and inserting said tongue of said hole into the center hole of said electric insulator from at least one end thereof.

4. A particulate trap as claimed in claim 2 wherein each of said electric insulators is a columnar member having a height substantially equal to the distance between said opposite filtering surfaces, and formed with a narrow portion at the center, said heater being formed with holes each having a cutout and a bendable tongue, each of said electric insulators being mounted on said heater by passing its head through each of said holes to bring said narrow portion into engagement with the edge of said cutout, while urging said electric insulator into said cutout with said tongue preventing said electric insulator from coming out of said cutout.

5. A particulate trap as claimed in claim 2 wherein each of said electric insulators is a ring-shaped member having one of its inner and outer diameters substantially equal to the diameter of one of said opposite filtering surfaces, said heater being a cylindrical member having cut-and-raise nails, each of said electric insulators being mounted on said heater by fitting it on the outer or inner periphery of said heater, and bringing said nails into engagement with both sides of said each electric insulator.

6. A particulate trap as claimed in claim 5 wherein said electric insulators comprise first ring-shaped insulators mounted on the inner surface of said heater and supported on the inner one of said opposite filtering surfaces, and second ring-shaped electric insulators mounted on the outer surface of said heater and supported on the outer one of the opposite filtering surfaces, said first and second electric insulators being arranged in a staggering pattern, thereby supporting said heater from both sides.

7. A particulate trap for use in a diesel engine comprising a case mounted in an exhaust gas line of the diesel engine, and a filter element mounted in said case and made from a three-dimensionally reticulated heat-resistant metallic material having pores communicating with each other, said filter element comprising at least two cylindrical filters having different diameters from each other and fitted concentrically one inside another to define exhaust gas incoming and exhaust gas outgoing spaces alternately in a diametric direction between said adjacent filters and inside the inner most filter, and said particulate trap further comprising a plate-shaped electric heater mounted in said exhaust gas incoming space for burning particulates trapped, each of said cylindrical filters having a non-porous axial end portion compressed to approximately a volume of metal of 15 percent or more, the compressed axial end portion being welded to a plate connected to another said filter cylinder of said trap or to a mounting of said case.

* * * * *